(12) United States Patent
McCoy et al.

(10) Patent No.: US 9,258,201 B2
(45) Date of Patent: Feb. 9, 2016

(54) ACTIVE DEVICE MANAGEMENT FOR USE IN A BUILDING AUTOMATION SYSTEM

(75) Inventors: Sean M. McCoy, Maple Grove, MN (US); Weiwei Sun, Woodbury, MN (US); Benedict J. Eiynk, North Branch, MN (US)

(73) Assignee: Trane International Inc., Piscataway, NJ (US)

( * ) Notice: Subject to any disclaimer, the term of this patent is extended or adjusted under 35 U.S.C. 154(b) by 762 days.

(21) Appl. No.: 12/710,845

(22) Filed: Feb. 23, 2010

(65) Prior Publication Data
US 2011/0208803 A1  Aug. 25, 2011

(51) Int. Cl.
| | | |
|---|---|---|
| H04L 12/24 | (2006.01) | |
| H04L 12/26 | (2006.01) | |
| H04L 29/08 | (2006.01) | |

(52) U.S. Cl.
CPC ........ *H04L 43/0817* (2013.01); *H04L 12/2697* (2013.01); *H04L 41/0681* (2013.01); *H04L 43/0811* (2013.01); *H04L 67/14* (2013.01)

(58) Field of Classification Search
CPC ............ H04L 12/2697; H04L 41/5012; H04L 43/0811; H04L 67/14; H04L 67/142; H04L 67/24
USPC ......... 709/203, 206, 207, 219, 223, 224, 227, 709/228
See application file for complete search history.

(56) References Cited

U.S. PATENT DOCUMENTS

| | | |
|---|---|---|
| 5,311,451 A | 5/1994 | Barrett |
| 5,321,603 A | 6/1994 | Schwenke |
| 5,384,697 A | 1/1995 | Pascucci |
| 5,444,851 A | 8/1995 | Woest |
| 5,463,735 A | 10/1995 | Pascucci et al. |
| 5,511,188 A | 4/1996 | Pascucci et al. |
| 5,522,044 A | 5/1996 | Pascucci et al. |
| 5,550,980 A | 8/1996 | Pascucci et al. |
| 5,559,955 A | 9/1996 | Dev et al. |
| 5,598,566 A | 1/1997 | Pascucci et al. |

(Continued)

FOREIGN PATENT DOCUMENTS

| | | |
|---|---|---|
| CN | 101589351 A | 6/2008 |
| CN | 101427239 A | 5/2009 |

(Continued)

OTHER PUBLICATIONS

"BACnet, LonWorks War Continues for BAS Manufacturers", p. 14, Mar. 10, 1997 Issue of Air Conditioning, Heating & Refrigerations News, 1 pg.

(Continued)

*Primary Examiner* — Barbara Burgess
(74) *Attorney, Agent, or Firm* — Patterson Thuente Pedersen, P.A.

(57) ABSTRACT

A building automation system (BAS) comprising a plurality of end devices, at least one communication network, and a server engine comprising a communication state manager for actively managing the state of various devices in building automation system and an associated reconnect manager to reestablish communication with off-line devices. The communication manager and the reconnect manager coordinate the interaction between the server engine and the devices in order to minimizing the load on the communication network, while also working to establish the working state of any of the end devices and to transition off-line to an on-line state.

4 Claims, 6 Drawing Sheets

(56) References Cited

U.S. PATENT DOCUMENTS

| | | |
|---|---|---|
| 5,761,432 A | 6/1998 | Bergholm |
| 5,805,442 A | 9/1998 | Crater et al. |
| 5,884,072 A | 3/1999 | Rasmussen |
| 5,982,362 A | 11/1999 | Crater et al. |
| 5,999,179 A | 12/1999 | Kekic |
| 6,028,998 A | 2/2000 | Gloudeman et al. |
| 6,067,477 A | 5/2000 | Waewalaarachchi et al. |
| 6,098,116 A | 8/2000 | Nixon et al. |
| 6,104,963 A | 8/2000 | Cabasek et al. |
| 6,115,713 A | 9/2000 | Pascucci et al. |
| 6,119,125 A | 9/2000 | Gloudeman et al. |
| 6,141,595 A | 10/2000 | Gloudeman et al. |
| 6,145,751 A | 11/2000 | Ahmed |
| 6,148,355 A | 11/2000 | Mahalingam |
| 6,154,681 A | 11/2000 | Drees et al. |
| 6,157,943 A | 12/2000 | Meyer |
| 6,167,316 A | 12/2000 | Gloudeman et al. |
| 6,240,326 B1 | 5/2001 | Gloudeman et al. |
| 6,241,156 B1 | 6/2001 | Kline et al. |
| 6,263,387 B1 | 7/2001 | Chrabaszcz |
| 6,266,726 B1 | 7/2001 | Nixon et al. |
| 6,334,107 B1 | 12/2001 | Gale et al. |
| 6,353,853 B1 | 3/2002 | Gravlin |
| 6,389,331 B1 | 5/2002 | Jensen et al. |
| 6,405,103 B1 | 6/2002 | Ryan et al. |
| 6,487,457 B1 | 11/2002 | Hull et al. |
| 6,496,893 B1 | 12/2002 | Arai |
| 6,519,264 B1 * | 2/2003 | Carr .................... H04L 12/5601 370/232 |
| 6,580,950 B1 | 6/2003 | Johnson et al. |
| 6,584,095 B1 | 6/2003 | Jacobi et al. |
| 6,584,096 B1 | 6/2003 | Allan |
| 6,598,056 B1 | 7/2003 | Hull et al. |
| 6,636,893 B1 | 10/2003 | Fong |
| 6,708,505 B2 | 3/2004 | Nakamura et al. |
| 6,714,977 B1 | 3/2004 | Fowler et al. |
| 6,832,120 B1 | 12/2004 | Frank et al. |
| 6,834,298 B1 | 12/2004 | Singer |
| 6,925,571 B1 | 8/2005 | Motoyama |
| 6,999,824 B2 | 2/2006 | Glanzer et al. |
| 7,010,796 B1 | 3/2006 | Strom et al. |
| 7,065,769 B1 | 6/2006 | Tolopka |
| 7,080,142 B2 | 7/2006 | Galloway et al. |
| 7,136,914 B2 | 11/2006 | Motoyama |
| 7,165,109 B2 | 1/2007 | Chiloyan et al. |
| 7,194,537 B2 | 3/2007 | Motoyama |
| 7,206,791 B2 | 4/2007 | Hind et al. |
| 7,240,106 B2 | 7/2007 | Cochran et al. |
| 7,246,162 B2 | 7/2007 | Tindal |
| 7,249,170 B2 | 7/2007 | Tindal et al. |
| 7,250,856 B2 | 7/2007 | Havekost et al. |
| 7,251,534 B2 | 7/2007 | Walls et al. |
| 7,275,079 B2 | 9/2007 | Brodsky et al. |
| 7,287,085 B1 | 10/2007 | Motoyama |
| 7,287,257 B2 | 10/2007 | Meza |
| 7,289,995 B2 | 10/2007 | Motoyama et al. |
| 7,293,253 B1 | 11/2007 | Soukup |
| 7,296,079 B2 | 11/2007 | Motoyama |
| 7,302,469 B2 | 11/2007 | Motoyama |
| 7,320,023 B2 | 1/2008 | Chintalapati |
| 7,337,242 B1 | 2/2008 | Motoyama |
| 7,349,761 B1 | 3/2008 | Cruse |
| 7,392,310 B2 | 6/2008 | Motoyama |
| 7,421,474 B2 | 9/2008 | Motoyama |
| 7,433,740 B2 | 10/2008 | Hesse et al. |
| 7,437,452 B2 | 10/2008 | Motoyama |
| 7,437,596 B2 | 10/2008 | McFarland |
| 7,447,766 B2 | 11/2008 | Motoyama |
| 7,500,003 B2 | 3/2009 | Motoyama |
| 7,502,848 B2 | 3/2009 | Motoyama |
| 7,506,048 B1 | 3/2009 | Motoyama |
| 7,512,450 B2 | 3/2009 | Ahmed |
| 7,519,698 B2 | 4/2009 | Motoyama |
| 7,533,167 B2 | 5/2009 | Motoyama |
| 7,533,333 B2 | 5/2009 | Motoyama |
| 7,536,450 B2 | 5/2009 | Motoyama |
| 7,574,503 B2 | 8/2009 | Motoyama |
| 7,606,894 B2 | 10/2009 | Motoyama |
| 7,610,372 B2 | 10/2009 | Motoyama |
| 7,610,374 B2 | 10/2009 | Motoyama |
| 7,634,555 B1 | 12/2009 | Wainscott, Jr. et al. |
| 7,647,397 B2 | 1/2010 | Motoyama |
| 7,765,289 B2 | 7/2010 | Park |
| 7,765,826 B2 | 8/2010 | Nichols |
| 7,870,090 B2 | 1/2011 | McCoy et al. |
| 7,904,186 B2 | 3/2011 | Mairs et al. |
| 7,917,232 B2 | 3/2011 | McCoy et al. |
| 8,024,054 B2 | 9/2011 | Mairs et al. |
| 8,050,801 B2 | 11/2011 | Richards et al. |
| 8,055,386 B2 | 11/2011 | McCoy et al. |
| 8,055,387 B2 | 11/2011 | McCoy et al. |
| 8,099,178 B2 | 1/2012 | Mairs et al. |
| 8,290,627 B2 | 10/2012 | Richards et al. |
| 8,316,438 B1 * | 11/2012 | Bush ...................... H04L 12/66 726/22 |
| 8,903,985 B2 * | 12/2014 | O'Connell .......... H04L 41/5012 709/224 |
| 2002/0016639 A1 | 2/2002 | Smith et al. |
| 2002/0029096 A1 | 3/2002 | Takai et al. |
| 2002/0042845 A1 | 4/2002 | Burmann et al. |
| 2002/0136203 A1 | 9/2002 | Liva |
| 2002/0141378 A1 * | 10/2002 | Bays .................. H04L 41/0893 370/351 |
| 2002/0152028 A1 | 10/2002 | Motoyama |
| 2002/0152292 A1 | 10/2002 | Motoyama |
| 2003/0074496 A1 * | 4/2003 | Takahashi ............ G06F 9/4843 710/20 |
| 2003/0084176 A1 | 5/2003 | Tewari et al. |
| 2003/0135765 A1 | 7/2003 | Hind et al. |
| 2003/0158975 A1 | 8/2003 | Frank et al. |
| 2003/0159129 A1 | 8/2003 | Frank et al. |
| 2003/0167323 A1 | 9/2003 | Motoyama |
| 2003/0202112 A1 * | 10/2003 | Bowman ................ H04N 7/147 348/261 |
| 2004/0025099 A1 * | 2/2004 | Aikawa ................ H04L 1/1887 714/748 |
| 2004/0059808 A1 | 3/2004 | Galloway et al. |
| 2004/0075549 A1 | 4/2004 | Haller |
| 2004/0143510 A1 | 7/2004 | Haeberle et al. |
| 2004/0148288 A1 | 7/2004 | Haeberle et al. |
| 2004/0215694 A1 | 10/2004 | Podolsky |
| 2004/0215740 A1 | 10/2004 | Frank et al. |
| 2004/0230323 A1 | 11/2004 | Glanzer et al. |
| 2004/0243988 A1 | 12/2004 | Ota |
| 2004/0249913 A1 | 12/2004 | Kaufman |
| 2004/0254915 A1 | 12/2004 | Motoyama |
| 2004/0255023 A1 | 12/2004 | Motoyama |
| 2004/0258011 A1 * | 12/2004 | Hiyama ................ H04W 60/00 370/328 |
| 2005/0050148 A1 * | 3/2005 | Mohammadioun ... H04L 1/1877 709/206 |
| 2005/0071483 A1 | 3/2005 | Motoyama |
| 2005/0090915 A1 | 4/2005 | Geiwitz |
| 2005/0177642 A1 | 8/2005 | Motoyama |
| 2006/0010232 A1 | 1/2006 | Page et al. |
| 2006/0047787 A1 | 3/2006 | Agarwal et al. |
| 2006/0058923 A1 | 3/2006 | Kruk et al. |
| 2006/0130107 A1 | 6/2006 | Gonder et al. |
| 2006/0155824 A1 | 7/2006 | Motoyama et al. |
| 2006/0184659 A1 | 8/2006 | Motoyama et al. |
| 2007/0005736 A1 | 1/2007 | Hansen et al. |
| 2007/0043476 A1 | 2/2007 | Richards et al. |
| 2007/0055698 A1 | 3/2007 | McCoy et al. |
| 2007/0055756 A1 | 3/2007 | Richards et al. |
| 2007/0055757 A1 | 3/2007 | Mairs et al. |
| 2007/0055758 A1 | 3/2007 | McCoy et al. |
| 2007/0055759 A1 | 3/2007 | McCoy et al. |
| 2007/0055760 A1 | 3/2007 | McCoy et al. |
| 2007/0061046 A1 | 3/2007 | Mairs et al. |
| 2007/0067062 A1 | 3/2007 | Mairs et al. |
| 2007/0204023 A1 * | 8/2007 | Ohta ...................... G06F 1/3221 709/223 |
| 2007/0261062 A1 | 11/2007 | Bansal et al. |

(56) References Cited

U.S. PATENT DOCUMENTS

| | | | |
|---|---|---|---|
| 2008/0117830 A1* | 5/2008 | Cheselka | H04L 12/2697 370/252 |
| 2008/0281472 A1 | 11/2008 | Podgorny et al. | |
| 2009/0006627 A1* | 1/2009 | Castellucci | H04L 12/403 709/226 |
| 2009/0083416 A1 | 3/2009 | Nass et al. | |
| 2010/0228805 A1 | 9/2010 | McCoy et al. | |
| 2011/0047259 A1 | 2/2011 | Sato et al. | |
| 2011/0047418 A1 | 2/2011 | Drees et al. | |
| 2011/0131336 A1 | 6/2011 | Wang et al. | |
| 2011/0208803 A1 | 8/2011 | McCoy et al. | |
| 2011/0213502 A1 | 9/2011 | Uden | |
| 2012/0109383 A1 | 5/2012 | Richards et al. | |
| 2012/0151392 A1* | 6/2012 | Takahashi | G06F 3/0481 715/764 |

FOREIGN PATENT DOCUMENTS

| | | |
|---|---|---|
| CN | 101632050 A | 1/2010 |
| GB | 2444451 A | 6/2008 |
| GB | 2445489 A | 7/2008 |
| GB | 2445686 A | 7/2008 |
| GB | 2465506 A | 5/2010 |
| WO | WO2007/024573 A2 | 3/2007 |
| WO | WO2007/024622 A2 | 3/2007 |
| WO | WO2007/024623 A2 | 3/2007 |
| WO | WO2010/096313 A2 | 8/2010 |

OTHER PUBLICATIONS

"Controls Companies See Opportunities on Internet", Mar. 1, 1997 Issue of Energy User News, 4 pgs.
Tracer Summit Web Server, Dated Mar. 2003, Document No. BAS-PRC014-EN, 13 pgs.
"Infinity WebServer" brochure, Copyright 1997 by Andover Controls Corporation, Document No. DS-WEBSVR-A, 2 pgs.
"Facility Management Unleashed: web.Client", Copyright 2002 by Andover Controls, Document No. BR-WC-A, 6 pgs.
"Building Automation Systems on the Internet", by Albert T.P. So, W.L. Chan and W.L. Tse, May/Jun. 1997 Issue of Facilities Magazine, vol. 15, No. 5/6, pp. 125-133.
"Connecting LonWorks and TCP/IP Enterprise Networks—Real Application Successes", by Coactive Aesthetics, dated 1997, 9 pgs.
"Remote Building Monitoring and Control", an ACEEE paper, dated Jul. 18, 1996, 13 pgs.
Remote Building Control Using the Internet,: by Edward Finch, Dec. 1998 Issue of Facilities Magazine, vol. 15—No. 12/13, pp. 356-360.
"Marketing Tracer Summit", a marketing guide dated Jan. 1998, Order No. BAS-MG-46, 12 pgs.
"Tracer Summit Users Network", a marketing guide dated Mar. 2002, Order No. BAS-SLM005-EN, 12 pgs.
Marketing the Tracer ZN.511 and ZN.521 Zone Controllers, a marketing guide dated Feb. 2001, Order No. BAS-SLM008-EN, 12 pgs.
http://www.nettedautomation.com/glossary_menue/glossy_r.
html—the Net is the Automation, Netted Automation GmbH, Information and Communication Systems (NAICS), 2000-2002, composed by John Black, Web page—http://www.nettedautomation.com/glossary_menue/glossy_r.html, printed Jan. 20, 2008, 2pgs.
"An Efficient Execution Model for Dynamically Reconfigurable Component Software"; Andreas Gal, Peter H. Frohlich, Michael Franz; Department of Information and Computer Science—University of California, Irvine; May 31, 2002; pp. 1-7; http://research.microsoft.com/~cszypers/events/WCOP2002/10_Gal.pdf.
Microsoft Computer Dictionary, Fifth Edition, "Server" definition, Published: 2002, Publisher: Microsoft Press, p. 474.
personalSCADA 2.0 User's Guide, Eutech Cybernetics Pte Ltd., 2002, 401 pgs.
"Tracer Summit, Building Automation System," TRANE, Doc #BAS-PRC001-EN, Aug. 2002, 20 pgs.
*Enterprise Buildings Integrator R310*, Specification Data, Honeywell, Mar. 2003, pp. 1-20.

\* cited by examiner

ACTIVE DEVICE MANAGEMENT FOR USE IN A BUILDING AUTOMATION SYSTEM

FIELD OF THE INVENTION

The present invention relates generally to building automation systems. More particularly, the present invention relates to device management techniques and systems for minimizing network traffic in building automation system architectures while maximizing device up-time.

BACKGROUND OF THE INVENTION

Building automation systems (BAS) are used to coordinate, manage, and automate control of diverse environmental, physical, and electrical building subsystems, particularly HVAC and climate control but also including security, lighting, power, and the like. Typical existing BAS systems are hardwired or use a proprietary communication standard or protocol to link the various subsystems and provide system-wide user access, monitoring, and control.

A BAS can comprise a plurality of end devices, a communication network, a server engine, and a graphical user interface (GUI) or other means of providing control and reporting data to a user. The end devices are each typically associated with a room, a space, a system, or a subsystem for at least a portion of a building or a campus. The communication network may support a plurality of communication protocols and communicatively couples end devices to the server engine. Examples of the types of data that these systems collect about the space, building or system can include pressures, temperatures, humidity level, power/energy readings, and other run-time statistics.

Hardwiring and manual programming of BAS systems can create a robust fixed system customized for a particular installation. These systems, however, often require extensive customization for each building or site. Particular manual programming and other installation elements may not be applicable to other systems, contributing to the costliness and time-consuming installation associated with such systems.

Further, hardwired systems and those using proprietary communication standards and protocols are difficult or impossible to integrate with system components, devices, panels, and other elements from different vendors or generations. For example, a campus of buildings in which an upgraded BAS is being installed may have existing previous generation (legacy) systems and systems from more than one vendor. Installing a BAS and making it compatible with the existing systems in such a situation is time-consuming, requiring extensive manual service and programming to integrate the existing devices and implement the custom BAS.

With the introduction of BACnet™, an ASHRAE (American Society of Heating, Refrigerating and Air-Conditioning Engineers) and ANSI (American National Standards Institute) protocol standard, and LonTalk™, a protocol integration approach developed by Echelon, some uniformity of standards and communications has been achieved in the industry. BACnet™ was intended to standardize HVAC interoperability and serve as a solution to industry-wide issues. In use, however, BACnet™ exists in multiple versions and includes various non-standard feature functions available to vendors.

One aspect of many BACnet™ compatible devices is the passive handling of communicating their condition of operation or on-line/off-line status. For example a device may transition from being on-line to off-line without actively notifying any other devices or even a system controller of the change in the device's status. For these types of devices the only method of detecting off-line conditions is for the system controller or other management engine to actively query or poll each individual device for its current status.

Those skilled in the art of network traffic management will recognize that the frequent or periodic polling of a large number of individual devices may lead to network performance degradation. Additionally, in the area of BAS management some devices may be battery operated or capable of only a limited data communication rate or processing capacity. Because of these potential conditions the use of a polling or periodic "heartbeat" method of gathering the state of every device in a BAS system may not be effective or desirable. For these and other reasons, a need remains for an intelligent BAS having the capability of actively managing the state of BACnet™ compatible devices and other proprietary devices that do not broadcast their change in status.

SUMMARY OF THE INVENTION

The present invention substantially addresses the aforementioned needs and embodiments of the present invention relate to a communication state manager for actively managing the state of devices in a building automation system (BAS), including but not limited to those systems utilizing BACnet™ compatible devices.

In one embodiment, a communication state manager is configured to monitor a plurality of devices connected to a central server engine through a network where the devices are passive in their management of communication state. The communication state manager provides the central server engine with the status of the plurality of the end devices. The server engine can comprise a user-interface for communicating the status of the plurality of end devices to a user.

The communication state manager can actively work to bring devices that have gone off-line back into an on-line condition through the use of decay algorithms that keep the network traffic to a minimum while utilizing best-case alternative for devices being off-line for both short-term and long-term scenarios. One example delay algorithm may determine the frequency at which to poll or request the status of a device based on the amount of time that the device has been off-line. By way of example, in a case where a device has been off-line for less than ten minutes it may be desirable to bring the device back on-line as quickly as possible. In this case attempts to communicate with the device made in short time intervals, such as every fifteen seconds. If the device continues to remain off-line, despite repeated attempts to bring the device back on-line, the refresh or polling rate of queries to the device may be reduced in order to reduce the load on the communication network. In one embodiment, the dynamically mediated polling rate is reduced to one query every thirty seconds if the device has been off-line for any period of time between ten and thirty minutes. If the device has been off-line for thirty minutes to an hour the refresh rate can be further reduced to a one-minute rate. Finally, if a device has remained off line for days, weeks, or some longer period of time it may be appropriate to stop attempting to communicate with the device altogether.

In another embodiment, the BAS can also include an alarm manager working in conjunction with the communication state manager in order to appropriately flag or alarm various devices to the user or manager of the BAS. As the communication manager is able to determine that a device has transitioned from an on-line to an off-line state, the system can raise an alarm depending on the type of device in question and other alarm or device configuration settings. Correspondingly, when a device is brought from the off-line state back to the on-line state that alarm can be removed. Alternatively, instead of removing the alarmed condition it may simply be flagged at a lower priority or simply marked as previously being in an alarmed condition.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The embodiments of the present invention may be more completely understood in consideration of the following detailed description of various embodiments in connection with the accompanying drawings, in which.

Figure 1:
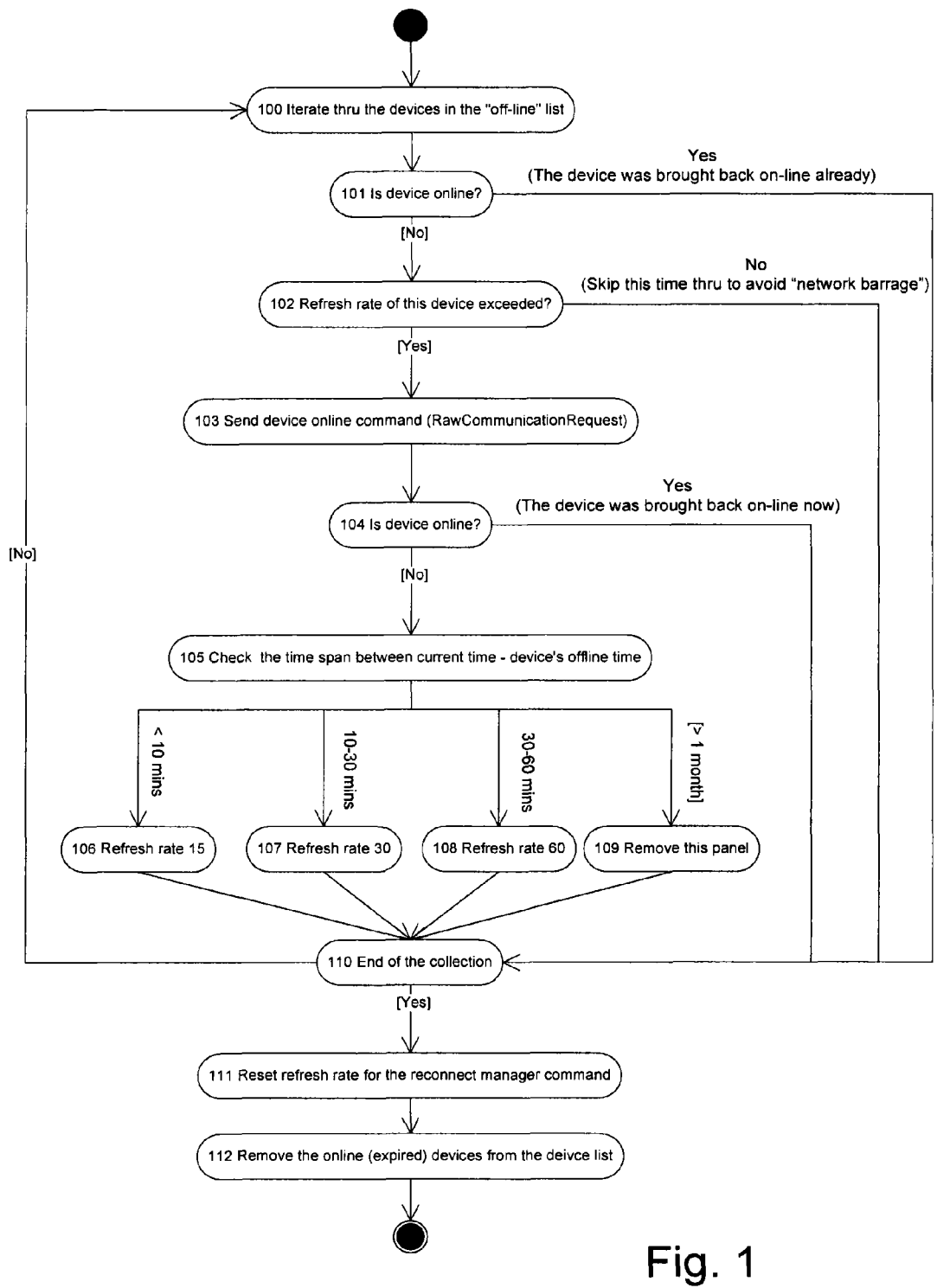
FIG. 1 is a flow diagram depicting a process reconnect manager.

While the present invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The systems and methods of the invention can effectively communicate with and manage devices in a local or widely distributed building automation system (BAS), from a space or building level to an enterprise level, encompassing virtually any structure, cluster, campus, and area in between. A BAS according to one embodiment of the present invention comprises a dynamically extensible and automatically configurable architecture anchored by an enterprise server engine (ESE). The BAS and ESE comprise a versatile and robust control system that operably supports the management of HVAC and other subsystems in a building from a central location. The BAS can be an automatically and intelligently scalable object-oriented system in one embodiment, providing multi-site management capabilities in a local or widely distributed geographic area. The BAS is preferably networked for user accessibility.

The systems and methods are particularly suited for a dynamically extensible and automatically configurable BAS and architecture, such as those disclosed in U.S. patent application Ser. No. 11/208,773, filed Aug. 22, 2005, entitled "Dynamically Extensible and Automatically Configurable Building Automation System and Architecture"; U.S. patent application Ser. No. 11/316,687, filed Dec. 22, 2005, entitled "Building Automation System Facilitating User Customization"; U.S. patent application Ser. No. 11/316,699, filed Dec. 22, 2005, entitled "Building Automation System Facilitating User Customization"; U.S. patent application Ser. No. 11/316,702, filed Dec. 22, 2005, entitled "Building Automation System Facilitating User Customization"; U.S. patent application Ser. No. 11/316,695, filed Dec. 22, 2005, entitled "Building Automation System Data Management"; U.S. patent application Ser. No. 11/316,697, filed Dec. 22, 2005, entitled "Building Automation System Data Management"; U.S. patent application Ser. No. 11/316,698, filed Dec. 22, 2005, entitled "Building Automation System Data Management"; U.S. patent application Ser. No. 11/316,703, filed Dec. 22, 2005, entitled "Building Automation System Data Management"; and U.S. patent application Ser. No. 11/316,410, filed Dec. 22, 2005, entitled "Dynamically Extensible and Automatically Configurable Building Automation System and Architecture," all of which are assigned to the assignee of the claimed invention, and are herein incorporated by reference.

The invention can be more readily understood by reference to FIGS. 1-5 and the following description. While the invention is not necessarily limited to the specifically depicted application(s), the invention will be better appreciated using a discussion of exemplary embodiments in specific contexts.

FIG. 1 depicts an exemplary embodiment of a Process Reconnect Manager. The Reconnect Manager is responsible for managing the logical processing steps for re-establishing lost communication connections with individual devices. It can be automatically configured to periodically iterate through all of the end devices or spaces associated with a BAS in order to obtain a device's status. The refresh rate, or the amount of time between communication requests, increases over time to reduce the overhead on the network. If there is no available device information the reconnect manager can set the refresh rate to the minimum value, further reducing the communication load on the BAS network.

Figure 4:
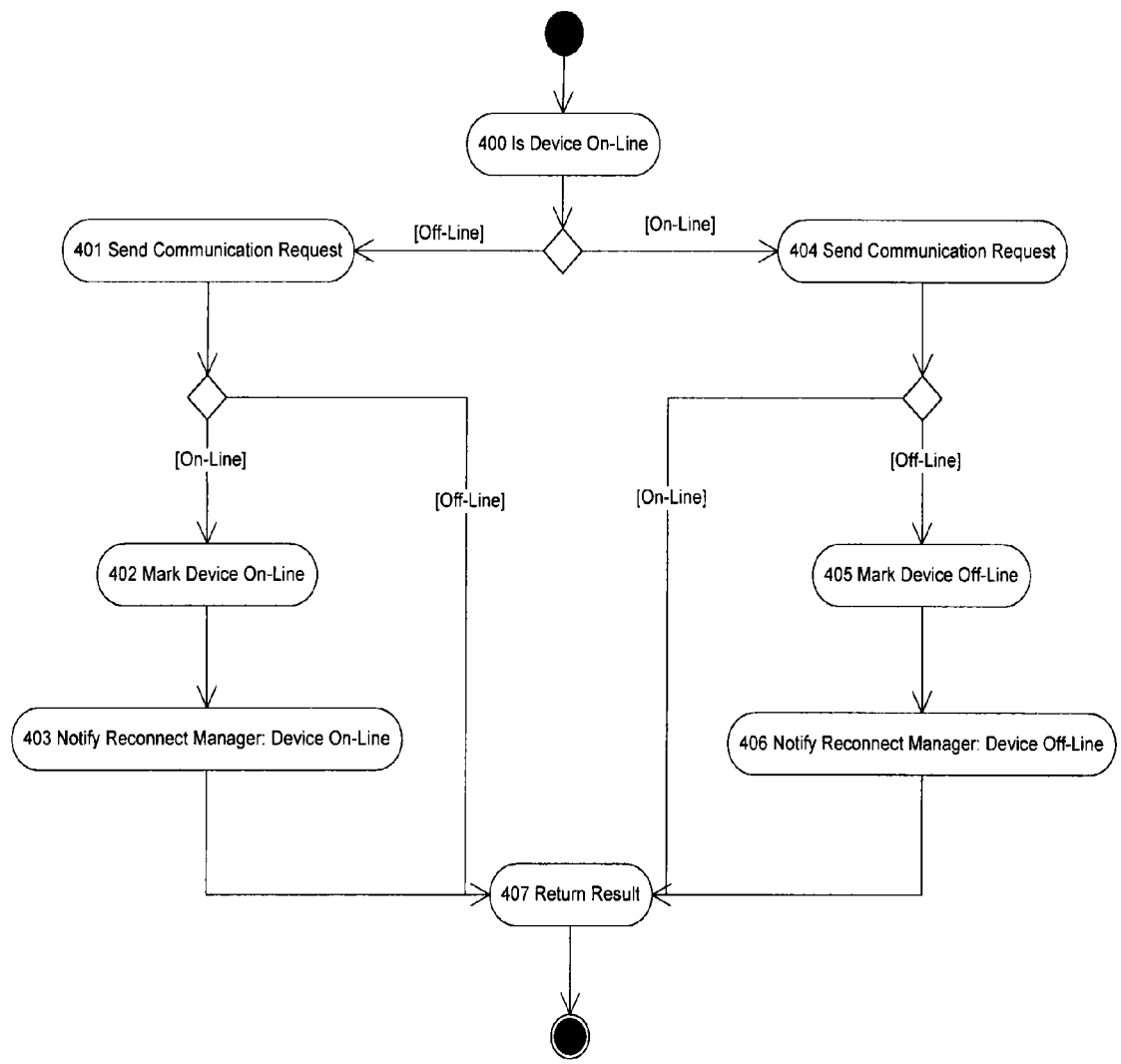
FIG. 4 is a flow diagram depicting raw communication requests.

An example of the processing logic in a potential embodiment of a Reconnect Manager that takes active responsibility in establishing a communication connection with a device is shown in FIG. 1. In the example embodiment the Reconnect Manager only begins executing this algorithm upon detecting that a device has stopped communicating 100, as indicated by the device being placed on an off-line devices list. The later discussion of FIG. 4 illustrates a process of determining when communication with a device has stopped.

If there is device collection data available the Reconnect Manager checks to see if the device associated with that data is on-line (101). If the device is on-line the process reconnect manager iterates (100) to the next device with collection data available. In the case where all the devices are on-line, the Reconnect Manager simply clears the list of any previously off-line devices. When the process reconnect manager detects a device that is off-line the process reconnect manager transmits a verify message to the device via a command link, typically a wired connection. The Reconnect Manager will then wait for a period of time determined by the amount of time the device has been off-line before attempting to retransmit a subsequent verify message. In the example embodiment shown in FIG. 1, if the off-line time is less than 10 minutes the refresh rate (106) is set to 15 seconds. This short interval is based on the relatively short time period that the device has been off-line. As the off-line time increases the refresh rate delay does so as well. These refresh rates and off-line periods can be initially configured during system installation or later modified by a user based on the needs of the BAS.

The decay algorithm in one potential embodiment can be a hard-coded value that cannot be tuned or changed by the user. If a device has been off-line for less than 10 minutes, the refresh rate (106) (or the frequency of the reconnect attempts) is 15 seconds. If a device has been off-line more than 10 minutes but less than 30 minutes, the refresh rate (107) is 30 seconds. If a device has been off-line more than 30 minutes but less than 60 minutes, the refresh rate (108) is 60 seconds. If a device has been off-line more than 1 month the system assumes that the device no longer exists in the system, or has irreversibly failed, and is removed from further processing attempts (109).

If the reconnect manager is able to successfully transition a device from the off-line state into an on-line state then the refresh state is set to the minimum time period for the system (111). The reconnect manager then proceeds to the next panel in the iteration. Once a device is brought back on-line the device is removed from the off-line devices list (112).

Figure 2:
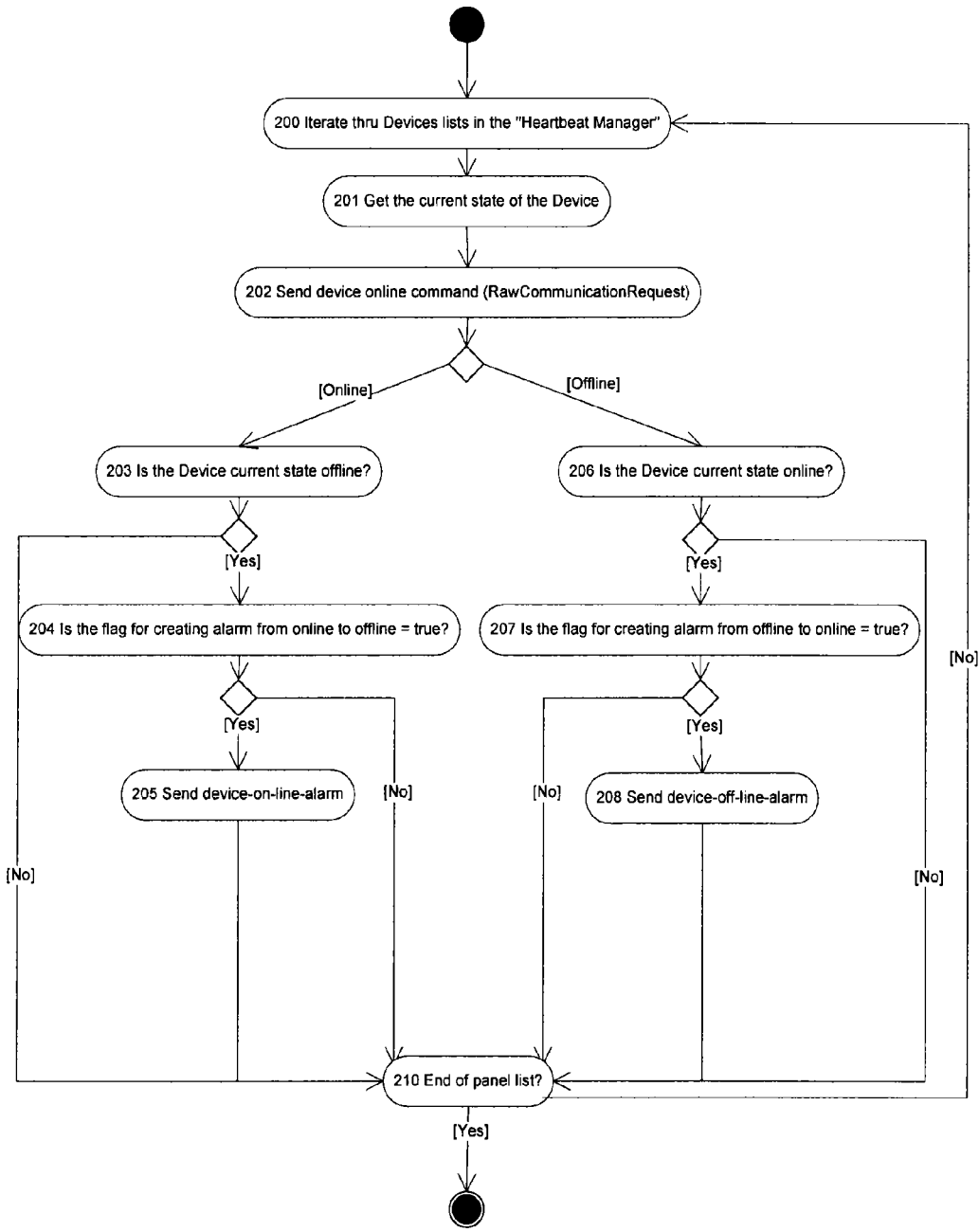
FIG. 2 is a flow diagram depicting a communication polling manager.

FIG. 2 depicts one embodiment of a communication-polling manager. The communication-polling manager iterates through all of the devices provided by a heartbeat manager (200) and retrieves the current state of each device (201) through the associated link between the enterprise server engine of the BAS and the individual device or module associated with the device. Preferably the heartbeat manager only provides the communication-polling manager with devices that are known to be off-line. Unlike a simple polling mechanism where all devices are periodically queried, one advantage of this exemplary embodiment is to utilize the normal communications mechanisms for on-line devices and when an off-line condition occurs, the system will dynamically poll the off-line device using a mediated decay-algorithm to bring the device(s) back on-line. Successful normal communications can also bring devices back on-line as discussed below regarding FIG. 4.

This service allows BAS administrators to establish a selective pinging process that checks on the communication state of devices while keeping network traffic to a minimum. If this process brings a device back on-line, or discovers that a device has gone off-line, it is registered with the Reconnect Manager. Alarm conditions can be triggered for both communication loss (208) and communication restore (205) based on customer configuration preferences. The separation of the communication polling manager and the reconnect manager provides the system with separate mechanisms for monitoring on-line devices for on-line to off-line transitions, and attempts to bring off-line devices back on-line. Messages, flags, signals or other indications can be passed between the communication polling manager and the reconnect manager in order to coordinate the status of the individual devices.

If the device is in the on-line state the communication polling manager checks to see if a flag has been set to alarm the transition from an off-line state to the on-line state (207). If the flag is set then the alarm is raised for that transition (208). If there is no flag indicating that an alarm should be raised for the off-line to on-line transition, likely due to the fact that the device was already on-line of the user has chosen to suppress the alarm, then no alarm is raised. If the device is in the off-line state the communication polling manager checks to see if a flag has been set to alarm the transition from an on-line state to the off-line state (204). If the flag is set then the alarm is raised for that transition (205). If there is no flag indicating that an alarm should be raised for the on-line to off-line transition.

Figure 3:
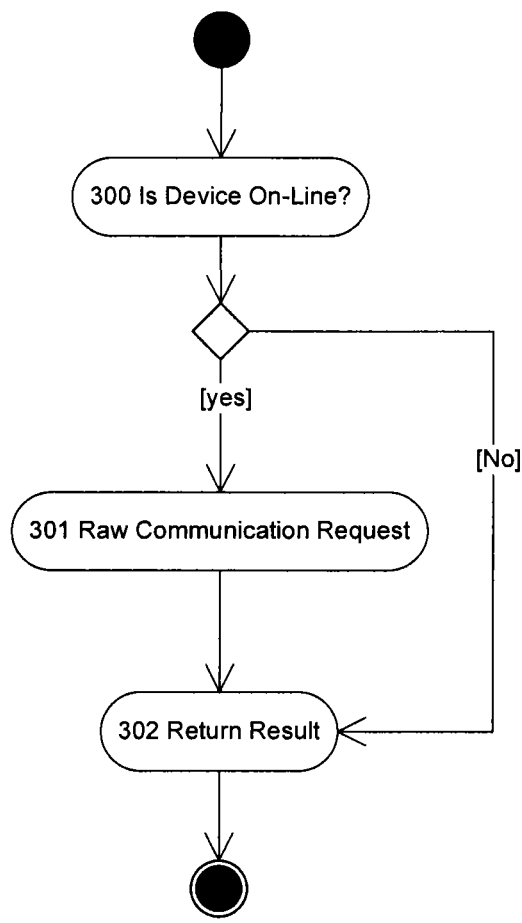
FIG. 3 is a flow diagram depicting smart communication requests.

FIG. 3 is a flow diagram depicting an embodiment of a smart-communication request. A smart-communication request is one that checks the communication state of the device (300) before sending a request over the wire, or making a raw-communication (301). This can be done as a performance optimization due to communication time-outs which can cause delays in processing and degrade the performance of the system. It also can be utilized to limit communication attempts with devices that are off-line to attempts made by the Reconnect Manager.

FIG. 4 is a flow diagram depicting raw-communication requests and expands the raw-communication block (301) in FIG. 3. A raw-communication request is one that will be sent over the wire, which is the actual transmission of signals out on the communication link to the device, regardless of the current communication state of the device. If the device is on-line, the Reconnect Manager is notified that communications is restored if the device was previously off-line (402 and 403). Conversely, if the device is off-line, the Reconnect Manager is notified that communication to the device has been lost if the device was previously on-line (405 and 406). Typically the Reconnect Manager should use raw communication requests as opposed to smart-communication requests.

FIGS. 1 through 4 together depict an embodiment of an Active Device Manager that can be implemented as part of a communication management component in a BAS. The normal communication requests can bring a device on-line, or off-line. The "smart requests" prevent a barrage of communication requests that can cause performance problems. The Reconnect Manager implements a mediated re-connection algorithm that has a decaying algorithm that reduces the re-connect attempts over time. This is in recognition that on-line devices have a tendency to stay on-line and recover quickly from a communication loss. And that off-line or disconnected devices have a tendency to stay off-line and not recover as quickly. Finally, the connection manager allows a user or BAS administrator to establish a customized dynamic polling mechanism for detecting and reporting on the communication state for devices in the network. This polling mechanism works in concert with the rest of the other processes and produces no extra overhead on the network or the end devices.

Figure 5:
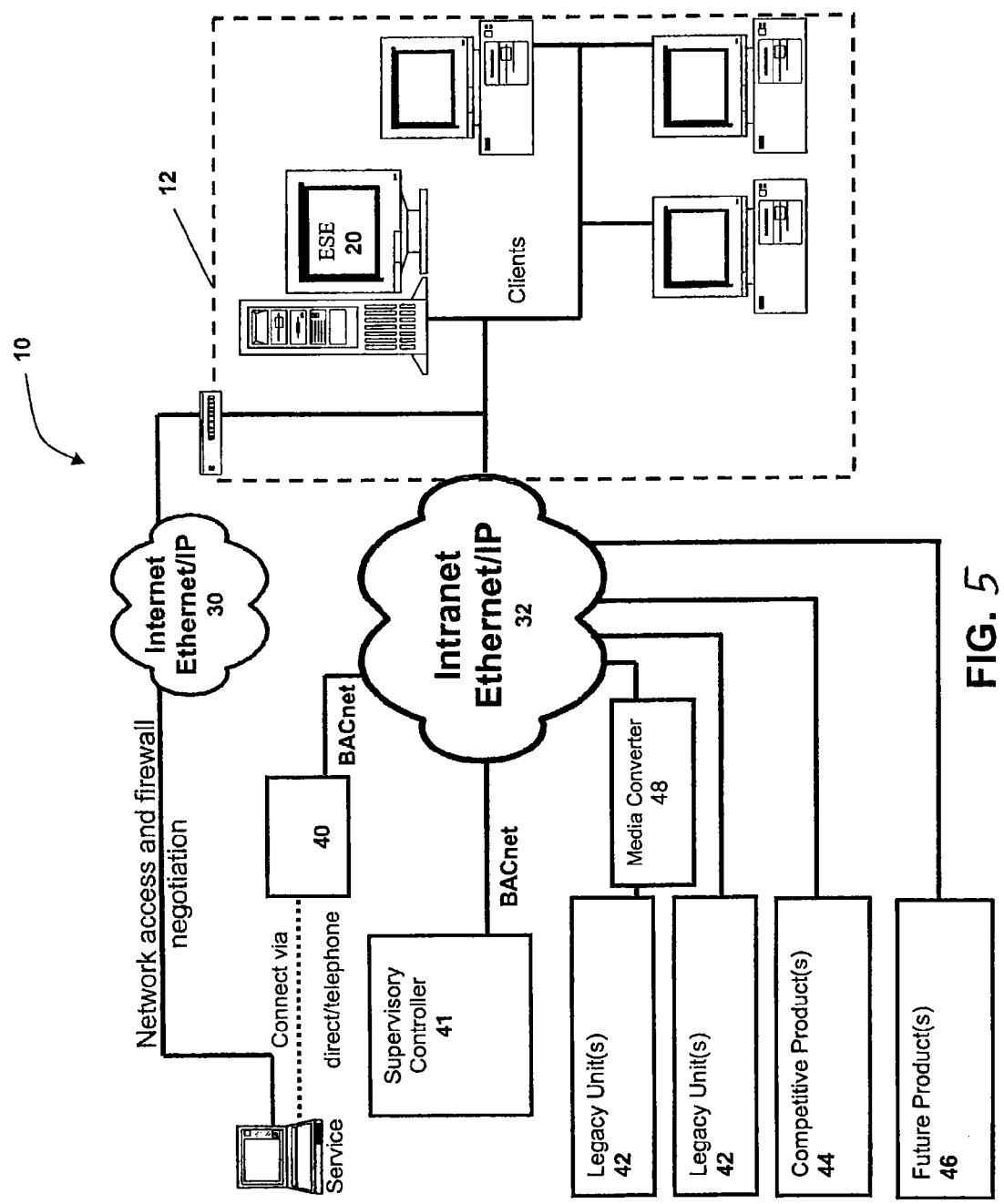
FIG. 5 is an exemplary embodiment of a building automation system (BAS).

Referring to FIG. 5, a BAS 10 embodiment can comprise an enterprise server engine (ESE) 20 preferably located at a central location 12, such as a headquarters or control station. ESE 20 comprises a single local device in one embodiment. In another embodiment, ESE 20 comprises a multiple server configuration operating in a local or distributed environment. "Central" location 12, as understood by those skilled in the art, is not necessarily a geographic center but rather a communicative or control-based location in one embodiment from which it is convenient or feasible to manage BAS 10. For example, a user may manage one or more BASs at locations nationwide or within a region from a single headquarters location.

ESE 20 is preferably locally networked at location 12 and communicatively coupled to the Internet and/or Intranet 30 and therefore can provide access and management control from virtually any location via a computer system, internal or external to a user's computer system. ESE 20 and BAS 10 need not be web-based or communicatively coupled to the Internet as shown in FIG. 5, as other options known to those skilled in the art exist. The Internet and/or Intranet Ethernet/IP 30 or another local area network (LAN) or wide area network (WAN) facilitate communications between ESE 20 and other system components and devices. Some or all communications and connections may be either wired or wireless within portions of BAS 10 as needed or desired.

Each implementation of system 10 can vary substantially by size, composition of devices, and balance of present, legacy, and future generation devices. System 10 can also vary by vendor/manufacturer, type, physical layout of building and/or campus, user needs, and other characteristics. Therefore, each implementation of system 10 and ESE 20 in particular is done on a site-by-site basis. ESE 20 can recognize, communicate with, and control a variety of system devices, including present generation and common manufacturer, legacy or previous generation, and competitor controllers and building automation panels. System 10, via ESE 20, can also expand to integrate next-generation devices.

As depicted in FIG. 5, for example, a present generation supervisory controller 41, such as a Building Control Unit manufactured by TRANE®, or a device 40, can be directly communicatively coupled to the Internet 30 and/or Intranet 32, while legacy unit(s) 42 can be directly communicatively coupled to the Internet 30 and/or Intranet 32 or coupled via a media converter 48. Media converter 48 is preferably a simple translator but may also comprise other more sophisticated devices as needed. Media converter 48 is preferably not but may also be used with competitive product(s) 44 and/or future product(s) 46 in various embodiments. Competitive products 44 are also preferably directly coupled to the Internet 30 and/or Intranet 32. ESE 20 is further able to support future product(s) 46, such as updated versions of current controllers, newly developed products, and the like. ESE 20 is also preferably able to coexist and cooperate with other similar but previous generation control and management systems.

Figure 6:
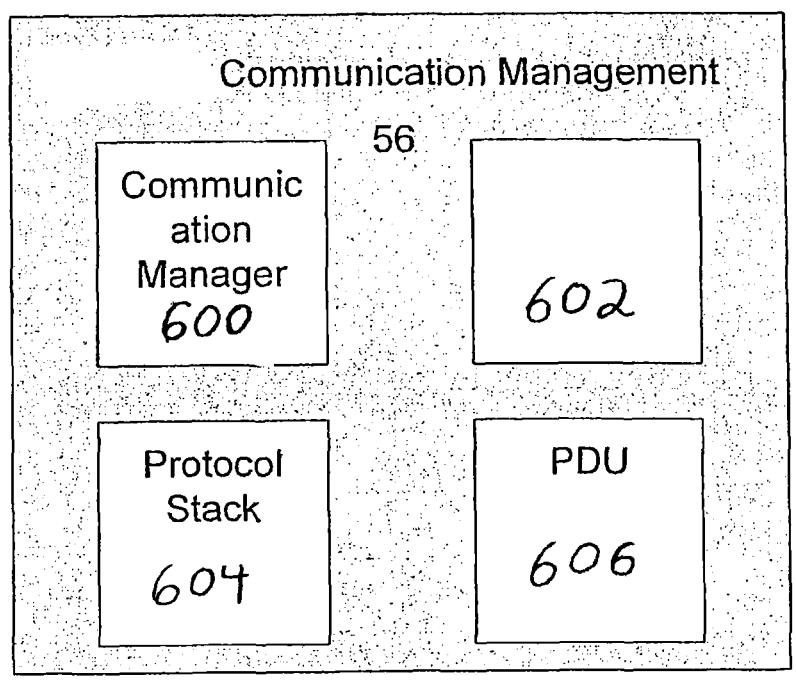
FIG. 6 is an exemplary embodiment of communication management component of a BAS.

FIG. 6 depicts a communication management component 56 that includes communication manager 600, Reconnect Manager 602, protocol stack 604 and protocol data unit (PDU) 606. Communication manager 600 is an object responsible for managing all the communication ports, threads, protocol stacks and other elements linking the ESE 20 to individual devices or equipment. The communication manager 600 and reconnect manager 602 can be implemented as separate sub-components, as shown in FIG. 6, or in an alternate embodiment the reconnect manager 602 can be implemented as a element of the communication manager 600.

The foregoing descriptions present numerous specific details that provide a thorough understanding of various embodiments of the invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention. It is manifestly intended that this invention be limited only by the following claims and equivalents thereof.

Each of the additional figures and methods disclosed herein may be used separately, or in conjunction with other features and methods, to provide improved devices, systems and methods for making and using the same. Therefore, combinations of features and methods disclosed herein may not be necessary to practice the invention in its broadest sense and are instead disclosed merely to particularly describe representative embodiments of the invention.

For purposes of interpreting the claims for the present invention, it is expressly intended that the provisions of Section 112, sixth paragraph of 35 U.S.C. are not to be invoked with respect to a given claim unless the specific terms "means for" or "step for" are recited in that claim.

All of the patents and patent applications disclosed herein, including those set forth in the Background of the Invention, are hereby incorporated by reference. Any incorporation by reference of documents above is limited such that no subject matter is incorporated that is contrary to the explicit disclosure herein. Any incorporation by reference of non-priority documents above is further limited such that no claims included in the documents are incorporated by reference herein and any definitions provided in the documents are not incorporated by reference herein unless expressly included herein.

The invention claimed is:

1. A computer-implemented method for managing the connection status of a plurality of end devices in a building automation system (BAS) comprising:
   providing a server engine communicatively coupled to the plurality of end devices by a network, the server engine including a connection manager;
   transmitting, by the connection manager, a first verify message to a one of the plurality of end devices via the network and incrementing a message count of the number of verify messages sent;
   waiting, by the connection manager, for a response to the verify message for a predefined wait-time period proportional to an amount of time the end device has been off-line, wherein the predefined wait-time period is defined by a decay algorithm including a plurality of states, at least some of the plurality of states each corresponding to a predefined range of time for which an end device is off-line;
   incrementing, by the connection manager, the wait-time period if no response to the verify message is received, checking if the message count has reached a maximum message value, transmitting another verify message if the maximum message value has not been reached;
   setting, by the connection manager, the wait-time period to a preconfigured minimum-time and clearing the message count if an affirmative response to the verify message is received; and
   discontinuing, by the connection manager, the transmission of verify messages to the one of the plurality of end devices if the message count has reached the maximum message value.

2. The method of claim 1, further comprising limiting communication to end devices that are off-line to verify messages by checking, by the connection manager, an on-line/off-line status indication before non-verify messages are transmitted to end devices.

3. The method of claim 1, further comprising sharing notifications between two components embodied in the server engine that include an indication if an end devices has transitioned from the off-line status to the on-line status or from the off-line status to the on-line status.

4. The computer-implemented method of claim 1, wherein the connection manager comprises a reconnect manager.

* * * * *